United States Patent [19]

Bonello

[11] Patent Number: 5,016,473
[45] Date of Patent: May 21, 1991

[54] ALTIMETER

[75] Inventor: Philippe Bonello, Grand-Saconnex, Switzerland

[73] Assignee: Sarcem Automation, Meyrin, Switzerland

[21] Appl. No.: 553,271

[22] Filed: Jul. 17, 1990

[30] Foreign Application Priority Data

Aug. 18, 1989 [CH] Switzerland ............... 3010/89

[51] Int. Cl.$^5$ .............................................. G01L 7/14
[52] U.S. Cl. .................................. 73/387; 73/729
[58] Field of Search ............... 73/387, 386, 384, 729; 116/DIG. 43; 340/977, 970

[56] References Cited

U.S. PATENT DOCUMENTS

| 3,472,084 | 10/1969 | Ellis ............................. 73/386 |
| 3,621,718 | 11/1971 | Ireland ......................... 73/386 |
| 3,831,451 | 8/1974 | Argentieri et al. ........... 73/387 |

*Primary Examiner*—Donald O. Woodiel
*Attorney, Agent, or Firm*—Young & Thompson

[57] ABSTRACT

The small altimeter according to the invention comprises a frame (7-11;14,15), a display comprising drums (45,79) and a dial (23) cooperating with a hand (46) and a multiplying gear train (53 to 57) driving the display in response to the displacements obtained by the aneroid elements (1 to 4). It comprises several aneroid elements (1 to 4) which are cylindrical and coaxial and connected together and with the frame (7-11) of the altimeter. This stacking is divided in two opposed groups (1,2; 3,4). The free faces of the two groups (1,2;3,4) of aneroid elements of the stacking are cynematically connected to a same movable member (31), which meshes in diametrically opposed points with two toothed members (29,30) belonging each to one of said cynematic linkages. The movable member (31) drives the display (45, 79, 23, 46) through the multiplying gear train (53, 57). The axis of the stacking of aneroid elements (1-4) is parallel to the shaft of the hand (46) of the display.

9 Claims, 3 Drawing Sheets

ALTIMETER

The present invention relates to a small size altimeter the mechanism of which shall, for mechanical power reasons, be equiped with two aneroid caps, each cap being itself formed of one or usually several aneroid elements.

Altimeters of this kind are described in Swiss patent application No. 2060/89 filed on June 1, 1989 of same applicant. The altimeter described in this document uses sliding movement transmission elements, and this can in severe extreme conditions of use cause bad workings due to the presence of too great friction forces acting against the force developed by the aneroid elements.

To obviate this drawback, the applicant has developed a new transmission mechanism of the movement of the aneroid element to the multiplication gearing of the altimeter constituting a particularly advantageous embodiment of the altimeter.

One object of the present patent is the realization of an altimeter having a small encumbrance, for example having a diameter of two inches, having an increased mechanical power and comprising a movement transmission mechanism having low or practically no friction.

The present small altimeter comprises a frame, a display having drums and a dial cooperating with a hand and a multiplying gear train driving the display from the displacement obtained by the aneroid elements. This altimeter is characterized in that it comprises several aneroid cylindrical and coaxial elements connected together and to the frame forming a stacking; by the fact that this stacking is divided in two opposed groups; by the fact that the free faces of the two groups of aneroid elements of the stacking are cinematically connected to a same movable member, this common movable member meshing at diametrically opposed points with two thoothed elements belonging each to one of said cinematical linkages; by the fact that this movable member drives the display through the intermediary of the multiplying gear train; and by the fact that the axis of the stacking of aneroid elements is parallel to the axis of the hand of the display i.e. to the longitudinal axis of the altimeter or of its housing.

The attached drawing shown schematically and by way of example.

Figure 1:
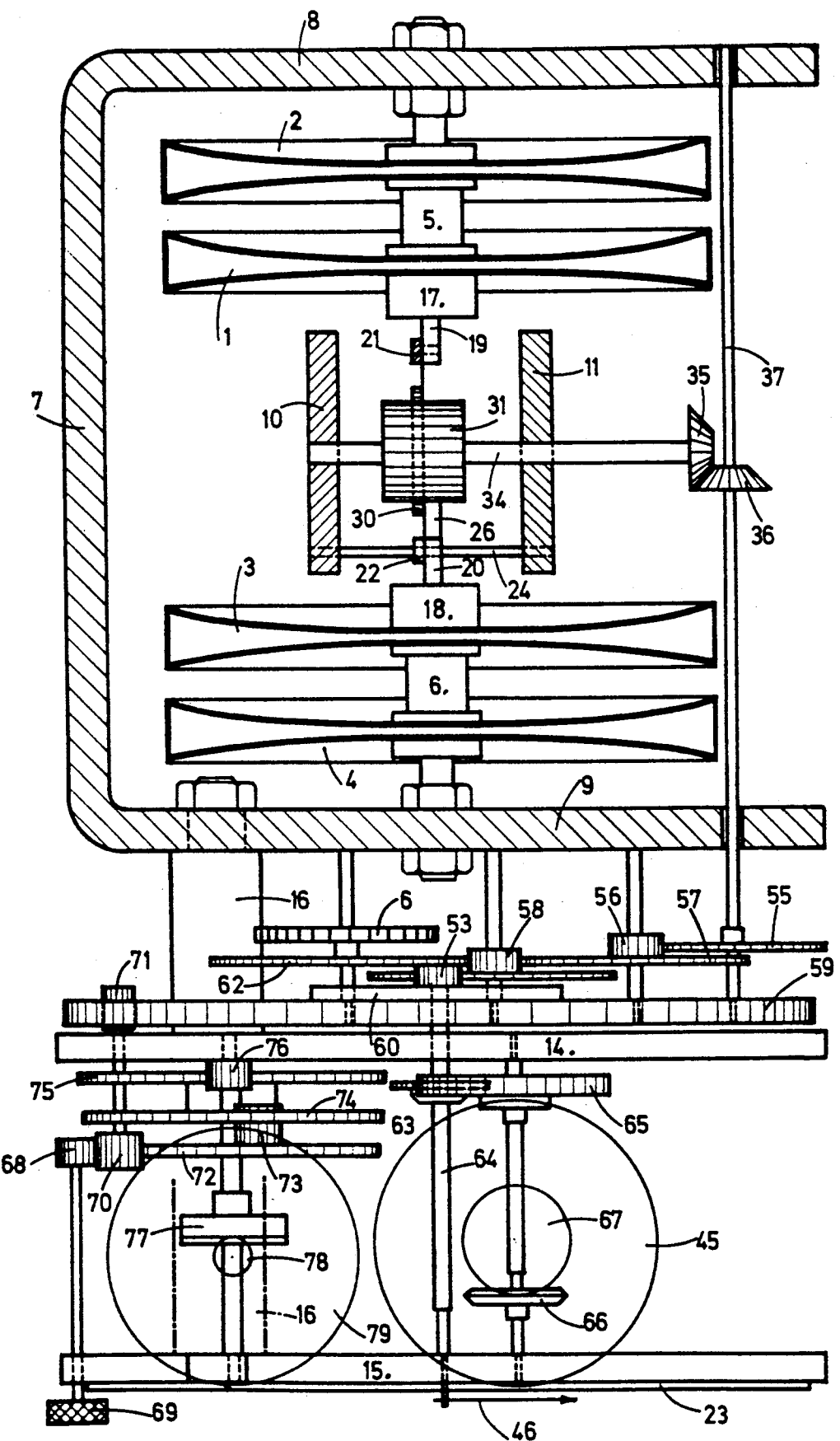
FIG. 1 is a longitudinal cross-section of the mechanism of the altimeter.
Figure 2:
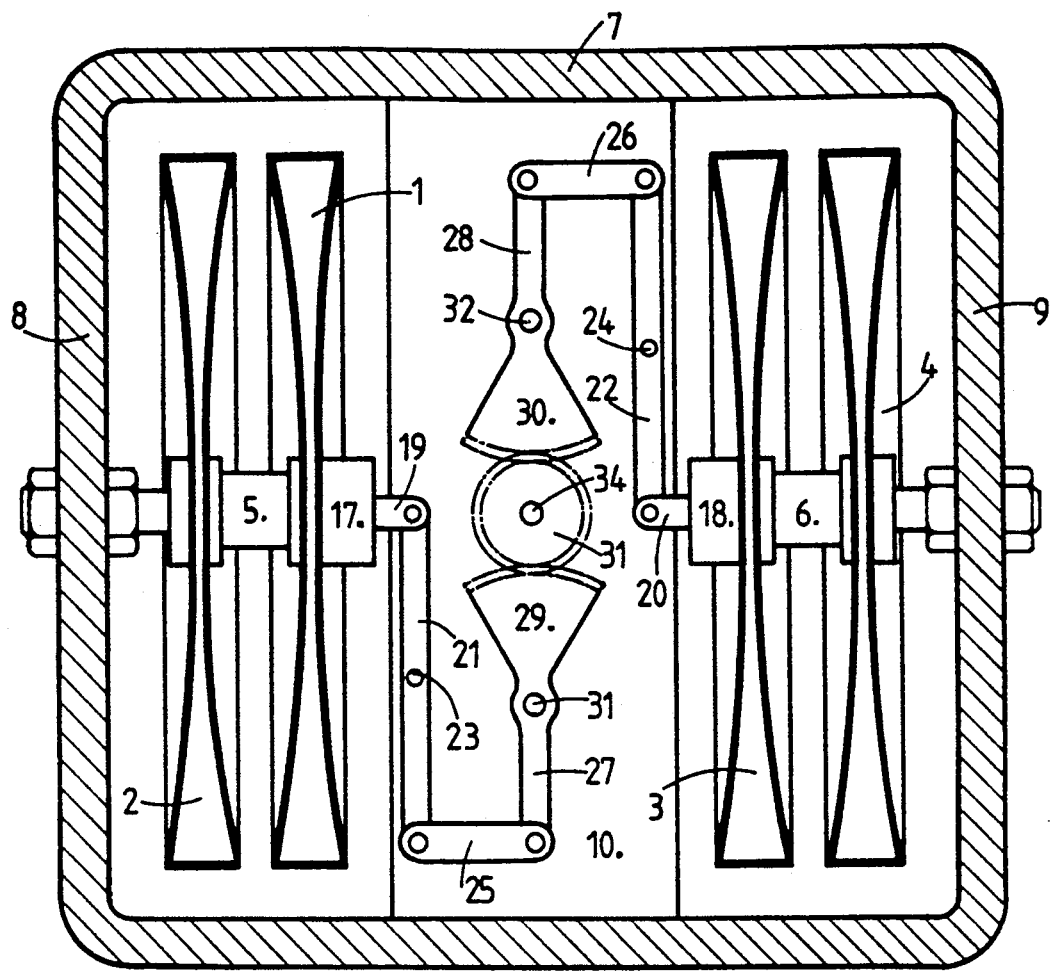
FIG. 2 is a top view of the altimeter shown at FIG. 1.
Figure 3:
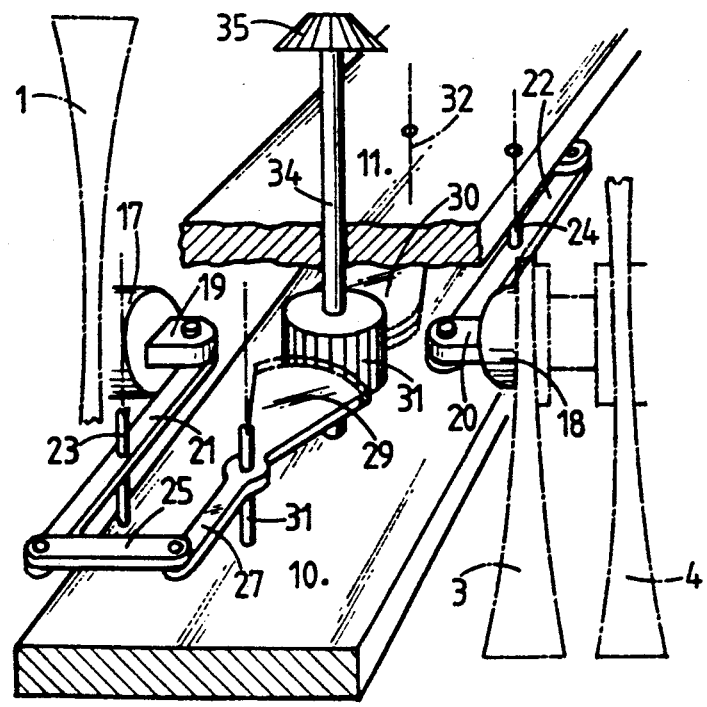
FIG. 3 shows a detail in perspective view of the altimeter shown at FIGS. 1 and 2.
Figure 4:
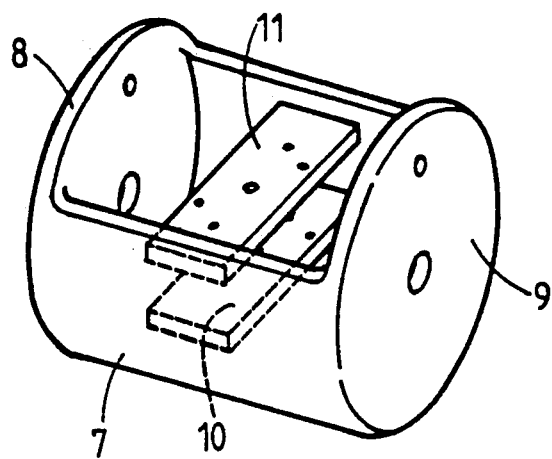
FIG. 4 shows a portion of the frame of the altimeter.

The altimeter and its mechanism shown at FIGS. 1 to 4 in its first embodiment comprises four aneroid elements 1, 2, 3 and 4 grouped in two caps the first comprising the elements 1 and 2 fastened together by the cross-beam 5 and the second the elements 3 and 4 fixed together by means of cross-beam 6.

The frame comprises a bed 7-9 as well as two plates 14, 15 which are circular and parallel between them and parallel to the walls 8, 9 of the bed. As seen later on, the bed 7-9 is rotatively mounted with friction onto the plate 14 which is rigidly fastened onto plate 5. The bed 7-9 is rigidly fixed to a great wheel 59 by means of studs 16.

The whole mechanism of the altimeter is mounted on this bed 7-9 and is fitted in a housing the rear wall of which comprises an air inlet duct provided with two filters, a coarse and a fine one, mounted the one behind the other, as well as eventually, if necessary, an electrical connector permitting the connection of lamps (not shown) lighting the dial and in some embodiment the feeding of the electromechanical vibrator. This housing comprises in its cylindrical wall a groove enabling the passage of electrical wires from the connector to the front part of the housing.

The frontal face of this housing comprises a dodecagonal shaped reinforced wall. A mirror, maintained by a screwed bezel, closes the frontal face of the altimeter.

The cap formed by the aneroid elements 1, 2 is rigidly fastened through the hub of the aneroid element 2 onto the wall 8 of the bed, whereas the cap formed by the aneroid elements 3, 4 is rigidly fixed through the hub of aneroid element 4 onto the wall 9 of the bed 7-9.

The bed 7-9 comprises further two cross-members 10, 11 connecting opposed portions of the cylindrical wall 7 and located between the two aneroid caps.

When this altimeter mechanism is submitted to pressure variations from 1013,25 to 115,97 milibars, each aneroid element 1, 2, 3 and 4 is deformed of a value of 2,5 milimeters, thus the cap comprising the aneroid elements 1 and 2 will deform of a value of 5 milimeters, and simultaneously the cap comprising the aneroid elements 3 and 4 will deform in the opposite direction also of a value of 5 milimeters for example. In this embodiment, the caps of aneroid elements 1, 2; 3, 4 are paired so as to permit identical linear displacements for identical given atmospheric pressure variations.

The central portions 17, 18 in front one of the others of the aneroid elements 1 respectively 3 comprises a lug 19, 20 hinged by means of a shaft on a lever 21, 22 itself pivoted in its middle portion on an axis 23, 24 fast on the cross-members 10, 11. The other end of the lever 21, 22 is connected by means of a connecting rod 25, 26 to rear rod 27, 28 of a toothed sector 29, 30. The connecting rods 25, 26 are pivoted at their ends on the levers 21, 22 respectively on the rods 27, 28 whereas the toothed sectors 29, 30 are pivoted around a shaft 31, 32 fastened on the cross-members 10, 11.

The two toothed sectors 29, 30 are simultaneously meshing with opposite sides of a pinion 33 carried by a shaft 34 pivoted in the cross-members 10, 11 and the upper end of which, in direction of the open part of the bed 7-9, carries a bevel gear 35. This bevel gear 35 meshes with the bevel gear 36 carried by a shaft 37 idly pivoted in the wall 8, 9 of the bed 7-9 and carrying at one of its ends the wheel 55 of the multiplying gearing driving the display.

The wheel 55 meshes with a pinion 56 comprising the wheel 57. This latter wheel 57 meshes with a pinion 58 comprising a wheel which finally drives the central pinion 53.

The whole assembly of the movable parts of the multiplying gear train turns on one hand in ruby bearings of the frame 8-15. On the other hand the pivotment of the movable part is made in a great wheel 59 fast with the bed 7-9 by means of columns 16 riveted and fixed to the bed. All these elements including the great wheel 54 form a rigid assembly for itself which is connected to the display module through a friction element (undulated circular spring) surrounded by a tightening disc 60. The coil spring 61 enables the taking up of the gear play. It is mounted on a wheel 62 identical to wheel 57 and meshing with it.

For the display, a wheel 63 driven on the central shaft 64 meshes with a wheel 65 carrying a third bevel gear 66 meshing with a fourth bevel wheel 67 located on the shaft of the display drums 45.

The milibar correction is ensured by a pinion 68 on the axis of a knob 69 in mesh with a pinion 70 which carries a pinion 71 meshing with the great wheel 59. Furthermore the pinion 70 meshes with a wheel 72 which carries the pinion 73 meshing with a wheel 74 carrying the wheel 75 meshing with the pinion 76 the axis of which carries the bell wheel 77 which finally meshes with the digit pinion 78 driving the correction display drums 79.

A rotation of the knob 69 causes in a continuous way simultaneously a modification of the correction display drum 79 and a rotation of the great wheel 59, thus of the assembly carried by the bed 7-9 and therefore of the hand 46 as well as the display drums 45 independently of an atmospheric pressure variation.

In this embodiment, each aneroid cap which comprises several aneroid elements is fixed for itself on one of the end walls 8, 9 of the bed and the inside face of each cap in front one another drives cynematic linkages which includes only pivotments to drive the central pinion 33.

Therefore, the same force multiplication effect is obtained as in the altimeter described in the application cited in the introduction while reducing the frictions since any sliding has been avoided in the transmission of the movement. The multiplying gear train is identical in both cases so as the correction mechanism and the display.

This embodiment is simpler, necessitates less parts and adjustments enhansing the fiability.

Figure 5:
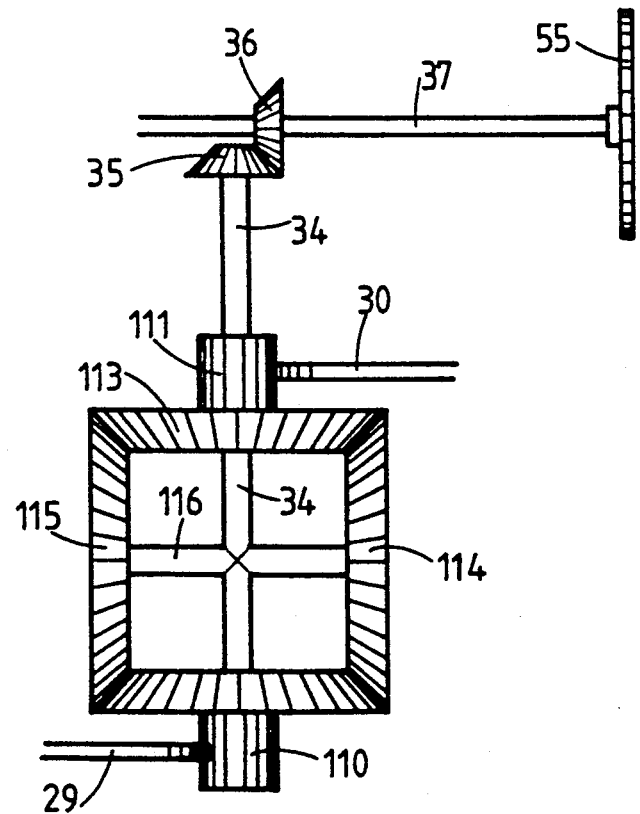
FIG. 5 is a partial representation of a variant of the mechanism of the altimeter.

In the variant shown at FIG. 5, the central pinion 33 is replaced by a differential, avoiding the necessity to match the aneroid caps. In fact in this realization, each toothed sector 29, 30 is in mesh with a pinion 110, 111 fast with a bevel gear 112, 113 respectively which is idly pivoted on the shaft 34.

The two bevel gears 112, 113 mesh simultaneously with two bevel wheels 114, 115 pivoted on a shaft 116 which is perpendicular to the axis 34 and fast with it. Therefore the rotation of the axis 34 is given by the two toothed sectors 29, 30 the forces of which are added, however if the angular displacements of these toothed sectors are not absolutely identical the difference is compensated by the differencial 112, 115 avoiding any risk of wedging.

I claim:

1. A small altimeter comprising a frame, a display having drums and a dial cooperating with a hand and a multiplying gear train driving the display from the displacement obtained by the aneroid element, characterized by the fact that it comprises several aneroid cylindrical and coaxial elements connected together and to the frame forming a stacking; by the fact that this stacking is divided in two opposed groups; by the fact that the free faces of the two groups of aneroid elements of the stacking are cinematically connected to a same movable member, this common movable member meshing at diametrically opposed points with two toothed elements belonging each to one of said cinematical linkages; by the fact that this movable member drives the display through the intermediary of the multiplying gear train; and by the fact that the axis of the stacking of aneroid element is parallel to the axis of the hand of the display i.e. to the longitudinal axis of the altimeter or of its housing.

2. Altimeter according to claim 1, characterized by the fact that the stacking contains four aneroid elements grouped in two caps having each two elements.

3. Altimeter according to claim 2, characterized by the fact that each cap is fixed onto one of the lateral walls of a bed of the frame; that the directions of their deformations are opposed, the one directed towards the front of the apparatus, the other toward the rear of said latter.

4. Altimeter according to claim 1, characterized by the fact that the two faces of the stacking of aneroid elements are facing each other and each of them drives a toothed sector in rotation through a cinematic linkage having only movements of pivotment.

5. Altimeter according to claim 1, characterized by the fact that the bed of the frame comprises lateral walls which are parallel between them and with the aneroid elements, said walls being connected toghether by a crown sector placed outside of the space occupied by the assembly of the aneroid elements, and by the fact that this bed comprises at least one cross-member extending perpendicularly to the axis of the stacking of aneroid elements and located between the two groups of said aneroid elements.

6. Altimeter according to claim 5, characterized by the fact that the toothed sectors are pivoted on the said cross-member of the bed and meshes with the said movable member.

7. Altimeter according to claim 6, characterized by the fact that the said movable member is a pinion, the two aneroid caps being paired or matched.

8. Altimeter according to claim 6, characterized by the fact that the said movable member is made by a differencial.

9. Altimeter according to claim 6, characterized by the fact that the movable member drives a shaft comprising a bevel gear meshing with a bevel pinion fast with a shaft pivoted in the lateral walls of the bed and comprising the first movable member of the multiplying gear train.

* * * * *